United States Patent
Godfrey (10) Patent No.: US 11,334,790 B1
(45) Date of Patent: May 17, 2022

(54) SYSTEM AND METHOD FOR RECURRENT NEURAL NETWORKS FOR FORECASTING OF CONSUMER GOODS' SALES AND INVENTORY

(71) Applicant: CaseStack, Inc., Santa Monica, CA (US)

(72) Inventor: Luke Godfrey, Rogers, AR (US)

(73) Assignee: Supplypike, LLC, Fayetteville, AR (US)

(*) Notice: Subject to any disclaimer, the term of this patent is extended or adjusted under 35 U.S.C. 154(b) by 1112 days.

(21) Appl. No.: 15/910,895

(22) Filed: Mar. 2, 2018

(51) Int. Cl.
| | |
|---|---|
| *G06N 3/08* | (2006.01) |
| *G06F 17/18* | (2006.01) |
| *G06Q 10/04* | (2012.01) |
| *G06F 16/2458* | (2019.01) |
| *G06Q 30/02* | (2012.01) |
| *G06N 3/04* | (2006.01) |
| *G06N 20/20* | (2019.01) |

(52) U.S. Cl.
CPC ........... *G06N 3/08* (2013.01); *G06F 16/2477* (2019.01); *G06F 17/18* (2013.01); *G06N 3/0454* (2013.01); *G06N 20/20* (2019.01); *G06Q 10/04* (2013.01); *G06Q 30/0202* (2013.01)

(58) Field of Classification Search
CPC ........ G06N 3/08; G06N 3/0454; G06N 20/20; G06F 16/2477; G06F 17/18; G06Q 10/04; G06Q 30/0202
See application file for complete search history.

(56) References Cited

U.S. PATENT DOCUMENTS

| | | | | |
|---|---|---|---|---|
| 9,646,262 | B2* | 5/2017 | Phillipps | G06N 20/20 |
| 9,985,984 | B1* | 5/2018 | Chavez | G06N 20/20 |
| 10,120,579 | B1* | 11/2018 | Patiejunas | G06F 3/061 |
| 10,339,440 | B2* | 7/2019 | Trask | G06N 3/04 |
| 10,423,889 | B2* | 9/2019 | Phillipps | G06N 20/20 |
| 10,817,782 | B1* | 10/2020 | Rando | G06N 3/08 |
| 10,929,801 | B1* | 2/2021 | Bektemirov | G06F 16/909 |
| 10,990,891 | B1* | 4/2021 | Atay | G06N 20/00 |
| 2018/0248904 | A1* | 8/2018 | Villella | G06N 20/00 |
| 2019/0213473 | A1* | 7/2019 | Dutta | G06N 3/08 |
| 2019/0215551 | A1* | 7/2019 | Modarresi | G06N 3/08 |

* cited by examiner

*Primary Examiner* — Keith D Bloomquist
(74) *Attorney, Agent, or Firm* — Wright Lindsey Jennings, LLP; Meredith Lowry (57) ABSTRACT

A computerized system and method for forecasting future performance values based on past performance data, the system training one or more neural networks on the past performance data, with the training facilitated by a training scheduler that extracts data points from a time series data array and prepares training jobs to be processed by a training worker utilizing the neural networks to process the training jobs to create a number of predicted values that when aggregated can be used to calculate a mean predicted value and a confidence metric.

7 Claims, 5 Drawing Sheets

SYSTEM AND METHOD FOR RECURRENT NEURAL NETWORKS FOR FORECASTING OF CONSUMER GOODS' SALES AND INVENTORY

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

For businesses, large and small, the ability to accurately forecast various trends related to consumer purchases can propel a company to the top of its market. Forecasting sales and inventory for consumer packaged goods (CPG) companies currently relies on time series analysis and forecasting models to predict future performance based on previously recorded sales performance. These companies are using statistical models and predictive analytics to increase consumer engagement and provide more accurate forecasts of consumer sales, inventory, and demand in order to use information to increase the predictability of sales—allowing a maximum amount of inventory to be sold. Time series forecasting, or the use of models to predict future values based on previously observed values, is a particular useful application, but comes with unique challenges. A system useful for time series forecasting that improves the future predictions is needed.

BRIEF SUMMARY OF THE INVENTION

Generally speaking, the present invention is directed to an integrated, computerized system useful for time series forecasting, the system including a number of components in communication with a microprocessor and a computer readable media stored at the microprocessor and having instructions for execution by the particular components. The components execute the instructions in a particular order such that an ensemble of neural networks work together to determine a number of prediction values and such that an aggregation of predictions from each neural network in the ensemble of neural network provides a single forecasted value and a confidence parameter associated with such single forecasted value. It may be seen that, because an ensemble of neural networks is used on a single data set, rather than a single neural network, each neural network has the capability of being trained on the same data set from a unique position such that the accuracy of the aggregate forecasted value generated by the ensemble of neural networks is increased based on the superior learning ability of the aggregate ensemble of networks.

These and other objects, features, and advantages of the present invention will become better understood from a consideration of the following detailed description of the preferred embodiments and appended claims in conjunction with the drawings as described following:

DETAILED DESCRIPTION OF THE INVENTION

Generally speaking, the present invention is directed to a computerized system useful for forecasting sales and inventory, and particularly to an integrated system using an ensemble of neural networks for forecasting future sales performance and needs based on past sale performances. The computerized system includes a number of components executing at a microprocessor in communication with a computer readable media storing instructions for execution by the components. The components execute the instructions in a particular order such that an ensemble of neural networks are trained on a set of data, each of the neural networks learning unique information about the data set, and such that the neural networks produce a number of predictions that can be aggregated to determine a mean predicted value to be used in forecasting needs. A confidence score is associated with mean predicted value that allows the user to determine the model's confidence in the accuracy of the predicted mean value.

Figure 1:
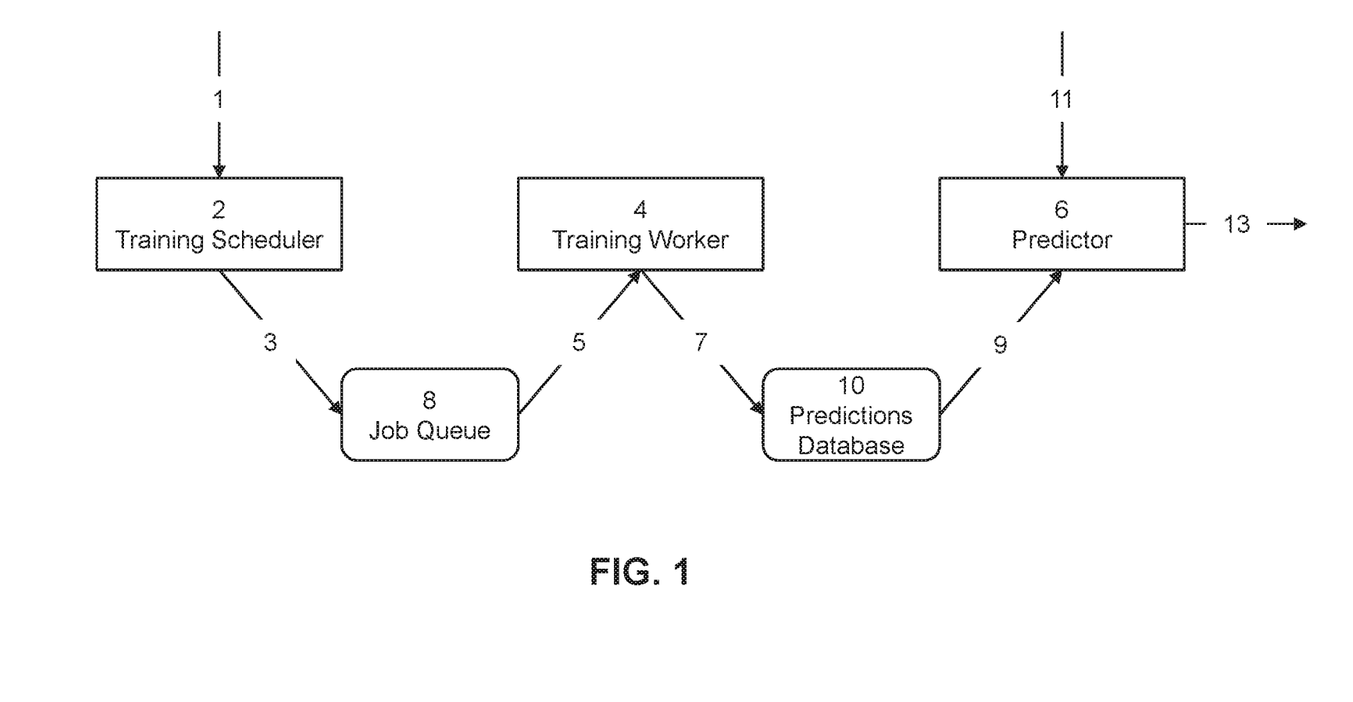
FIG. 1 is a schematic diagram showing the general components and process of the forecasting system of the present invention.

Turning to FIG. 1, a high level overview of the entire computerized system may be described. As shown, the integrated system consists of three main components: a training scheduler web service 2, a training worker web service 4, and a predictor web service 6. These main components are connected by two supporting parts, with the training scheduler 2 and training worker 4 connected by a job queue routine 8 and the training worker 4 and predictor 6 being in communication with one another through a predictions database 10. In the most basic of terms, the system is configured to execute instructions that perform the following basic steps (a) schedule training jobs 3, (b) process training jobs 5, (c) make predictions 7, and (d) fetch and aggregate predictions 9. The scheduling step 3 and fetching/aggregating step 9 involve external user inputs 1, 11 and are accomplished by the training scheduler 2 and predictor 6, respectively. The processing step 5 and predicting step 7 are performed asynchronously by the training worker 4 as training jobs become available in the job queue 8.

Figure 2:
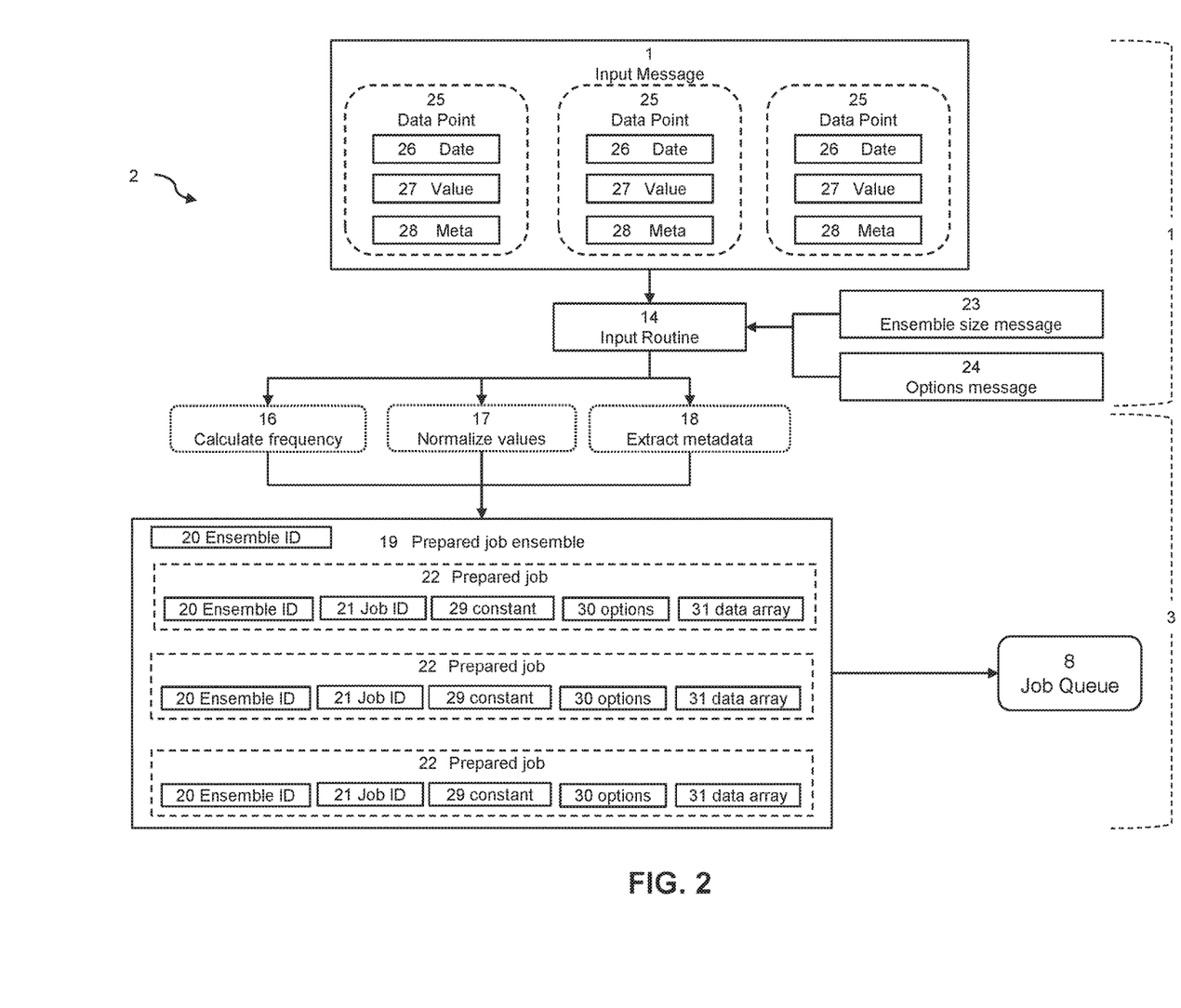
FIG. 2 is schematic diagram showing the training scheduler of the forecasting system of the present invention.
Figure 3:
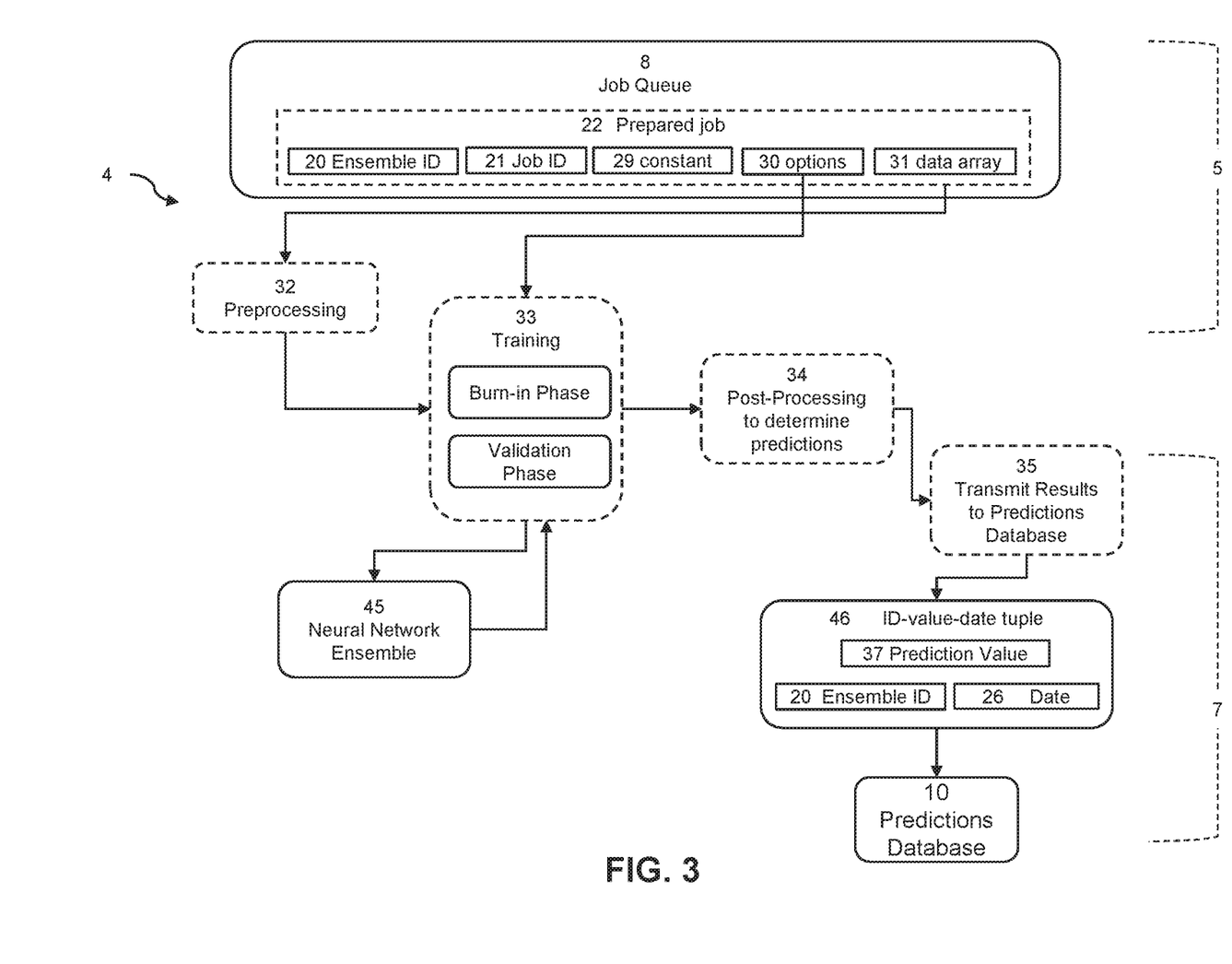
FIG. 3 is a schematic diagram showing the training worker of the forecasting system of the present invention.
Figure 4:
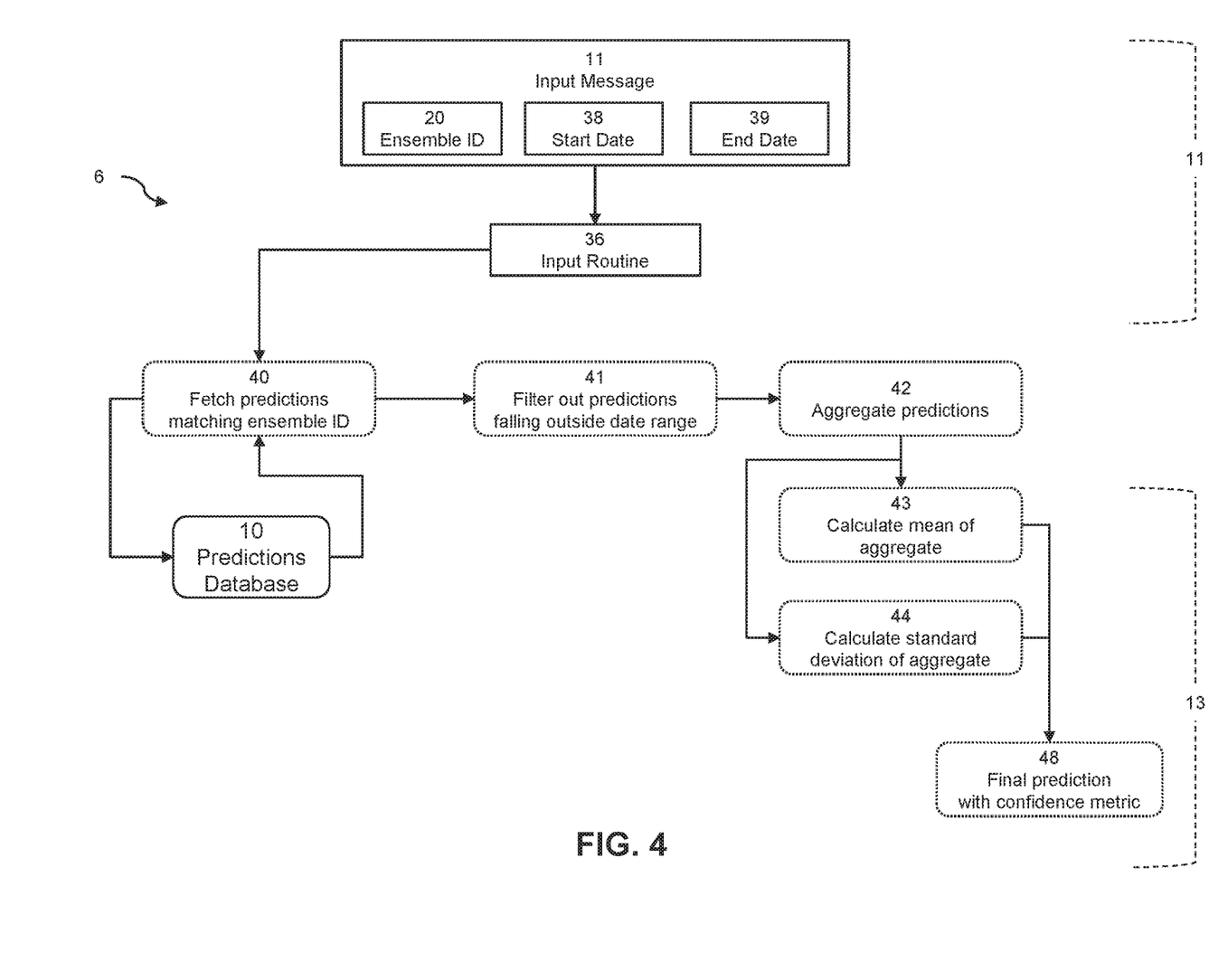
FIG. 4 is a schematic diagram showing the predictor of the forecasting system of the present invention.

The training scheduler 2 includes an input routine 14 that is configured to receive time series input information from a data input message 1, as shown in FIG. 2. The training scheduler 2 uses the time series input information to create an ensemble 19 having an ensemble ID 20 and a number of training jobs 22 and then calls upon the job queue routine 8 to schedule the training jobs 22 for processing by the training worker 4. Once the job queue routine 8 schedules the training jobs 22, the training worker 4 reads the training jobs 22 at the job queue routine 8 and processes the jobs 22 in the order in which they are scheduled at the job queue routine 8. Processing 5 a training job 22 involves creating and training a neural network, making predictions, and transmitting 7 such predictions to the predictions database 10, as shown in FIG. 3. The predictor 6 includes an input routine 36 that is configured to receive one or more input message 11 containing an ensemble ID input and date range inputs 38, 39, as shown in FIG. 4, Once the predictor input routine 36 receives such input message 11, the predictor 6 locates and fetches 40 the stored predictions corresponding to such ensemble ID 37 and date range 38, 39 from the predictions database 10. Because multiple neural networks are used, a number of predictions corresponding to the predictor input information 11 will be fetched 40 from the predictions database 10. The predictor 6 is configured to aggregate 42 the multiple fetched predictions from the multiple neural networks as a single forecast and generate a confidence score relaying the system's confidence in the aggregate predicted value. The confidence score and predicted value are provided in an output 13. While the foregoing description provides a general, high level overview of the system and method of the present invention, each of the individual components are described more completely below.

Turning now to FIG. 2, the training scheduler 2 may be described in more detail. As mentioned previously, the training scheduler 2 includes an input routine 14 that receives one or more data input messages 1 from the user. The input routine 14 is configured to receive the data input message 1 and read from the data input message 1 a series of data points 25. A data point 25 is described as a single record of time series data, A single data point 25 includes three fields of information: date 26, value 27, and meta 28. The date field 26 includes a timestamp that corresponds to the date when the record associated with the data point 25 occurred. The value field 27 corresponds to the actual value of the record associated with the data point 25 observed in the time series. For example, the value field 27 may include the numeric value corresponding to the volume of sales in a particular region of a particular product. The meta field 28 corresponds to any additional information or variables that might be useful for understanding the behavior of the time series. Information that may be included in the meta field 28 includes information such as whether the data point 25 occurred on a holiday or if there was a major weather event around the time period associated with the data point 25. It may be seen, then, that when the ensemble of neural networks analyze the data point 25 at the training worker 4, it may determine how, for example, how a certain weather event may impact the sales of a particular product.

In some cases, all of the fields relating to a particular data point 25 may be known, and therefore the data input message 1 for that data point 25 will have a value in each of the fields for that data point 25. In some cases, however, a particular field of the data point 25 may be unknown. In such a case, that particular field may be omitted entirely or otherwise denoted as unknown to indicate that the other fields are known but that particular field is unknown. For example, it is possible that the date 26 and meta 28 fields for a particular data point 25 are known but that the value field 27 of the data point 25 is unknown. Such a data point 25 with date 26 and meta 27 fields but without a value field 28 may be referred to as a "context data point" because, although the data point 25 does not provide any insight to products sold (i.e. value 28), the data point 25 does provide context relating to certain dates 26 or events (i.e. meta field 28 information) that may be useful for predicting future observations. As such, a sequence of data points 25 that do not have value field inputs 27 may be referred to herein as "context data," where as a sequence of data points 25 that do have a value field input 27 may be referred to as training data because such data is used to train a predictive model.

Once the data input message 1 is received at the input routine 14 of the training scheduler 2, the training scheduler 2 creates an ensemble ID 20 and a number of training jobs 22 based on the information received in the data input message 1. The term training job refers to a tuple containing a scaling factor that is used for pre- and postprocessing data, an array of data points, and a set of key-value pairs to be used as options in the trainer. These key-value pairs are referred to as hyperparameters. In the preferred embodiment, the training schedule is a RESTful web service (where REST refers to a representative state transfer) with two endpoints: one for creating a training job and one for fetching the progress of a running training job. The fetching routine is configured to return a number between 0 and 100 indicating the percent completion of a running job from the job queue. The job creating routine is configured to create training jobs based not only on the information contained in input message 1, but also based on other input messages. The primary input (and the only one absolutely required to create the training jobs 22) is data input message 1. As mentioned above, data input messages 1 consist of an array of data points 25 representing a time series, with data points 25 including value field data 27 used as training data and those not including a value 27 (or mark the value 27 unknown) are used as context data. In addition to these data point messages 1, the input routine 14 may also receive an ensemble size message 23 and an options message 24. The ensemble size message 23 provides an ensemble size that corresponds to the number of training jobs 22 to be prepared and scheduled by the training scheduler 2. If no ensemble size message 23 is provided, a default number of training jobs 22 is assigned. In the preferred embodiment, the default number of training jobs 22 is ten, but the default number may be modified depending on the user's desires. The options message 24, if any is input at all, includes one or more hyperparameters to be used for the training process (described in more detail below).

Once these input messages 1, 23, 24 are received by the input routine 14 of the training scheduler 2, the training scheduler 2 processes the data as follows. First, at step 16 (as shown in FIG. 2) the training scheduler 2 extracts a year, month, day of the month, and day of the week from the date field 26 of each data point 25 and adds such information to the metadata of the data point 25. The training scheduler 2 does this for each data point 25 and uses the information from the date field 26 to calculate the frequency of the data as daily, weekly, monthly, or irregular. Then, at step 17, the training scheduler 2 normalizes the values by calculating a constant scale such that the absolute value of the data point 25 values multiplied by that scale are all less than or equal to 1. Next, the training scheduler 2 ensures that meta fields 28 appearing in any input data point 25 appear in every data point 25, explicitly marking the meta field 28 as unknown if they are not already present in each data point 25. Finally, the training scheduler 2 prepares training jobs 22, the number of which corresponds to the ensemble size input value 23 (or the default ensemble size if no ensemble size value 23 is input into the routine 14). Each training job 22 created is identical and contains the scale used to normalize data point values, the options, and data. Each training job 22 is also assigned an unique job identification marker 21 and a list of these job IDs is stored in a database, where the particular list of job IDs is assigned a list identification marker, which is referred herein as an ensemble ID 20. The ensemble ID 20 is returned to the application that called the training scheduler 2. Once the jobs 22 are created, they are input into the job queue 8, which is a first-in, first out collection of training jobs 22. The job queue 8 receives the jobs 22 from the training scheduler 2 and communicates the jobs 22 to the training worker 4.

The training worker 4 is an application for processing the training jobs 22 created by the training scheduler 2 and input into the job queue 8. The training worker 4 is in communication with the job queue 8, as shown in FIG. 1, and the training worker 4 remains in a stand-by mode until a job 22 is input into the job queue 8. Once a job is received at the job queue 8, the training worker 4 is configured to process 5 that job. Of course, the job queue 8 may receive multiple jobs 22, and if so, the training worker 4 is configured to process 5 the jobs 22 in the order in which they are received by the job queue 8. As shown in FIG. 3, the training process executed by the training worker 4 generally includes four steps: preprocessing 32, training 33, post processing 34, and result transmission and storing 35. Given a particular training job 22 containing the constant scale, a data array 31 (an array of data points 25), and options 30 (hyperparameters for the neural network), the training process executed by the training worker 4 is capable of self-learning such that eventually a higher accuracy prediction is obtained. The individual steps of the training process executed by the training worker 4 are described below.

In the first step, the preprocessing step 32, all unknown meta values 28 in each data point 25 of the data array 31 for the particular training job 22 are set to zero and the data points 25 of the array 31 are split into two groups: past and future. Past refers to the sequence of data point 25 values 27 multiplied by the scale constant along with meta values 28 associated with the next data point 25. Future, on the other hand, is the sequence of meta values 28 associated with context data (that is, data points 25 with no known value field data 27), shifted such that the $i^{th}$ entry is the meta value 28 for the $(i+1)^{th}$ forecasted point. Past and future are both matrices such that they can be used as input into a neural network.

Figure 5:
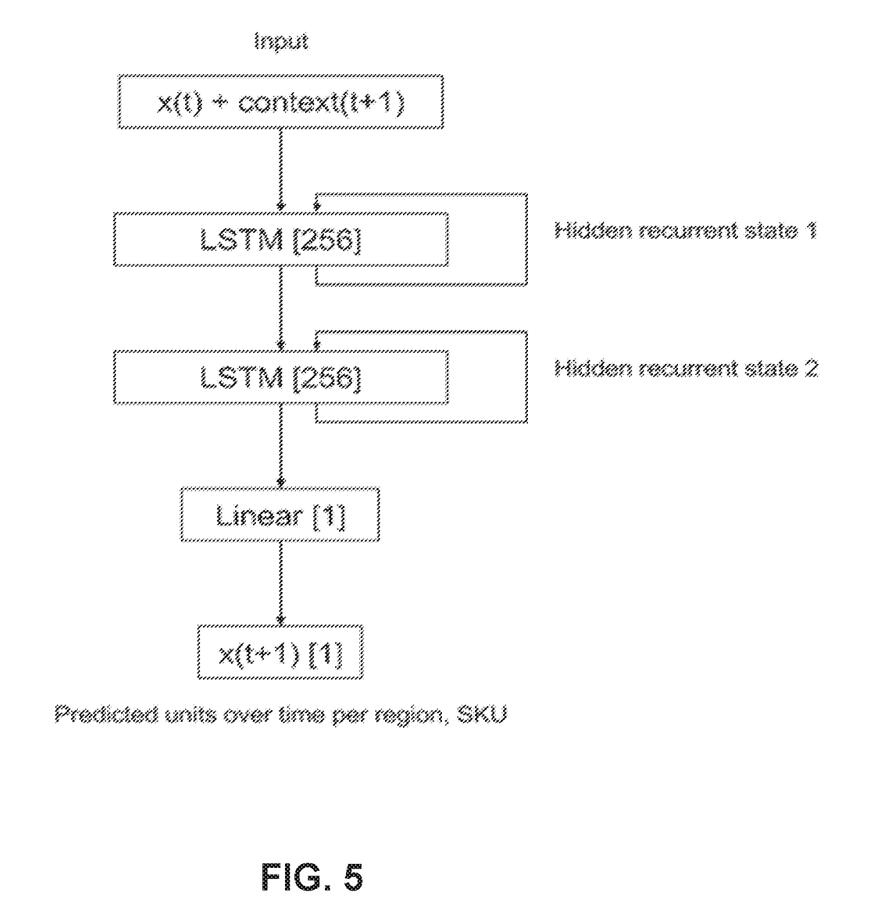
FIG. 5 is a schematic diagram showing the architecture of a single neural network of the neural network ensemble of the forecasting system of the present invention.

Once preprocessing 32 has occurred, the training component 33 of the process beings, with this training component 33 utilizing the options hyperparameters 30. A number of options hyperparameters 30 may be used. For example, sequence length may be used to refer to how far back a data point 25 is relevant. If no sequence length is provided, a default sequence length is used. For example, the sequence length may default to a value of 18, representing a monthly time series with a relevant span of 18 months. Another options hyperparameters 30 that may be used is batch size, which corresponds to how many subsequences to train on simultaneously. If no batch size is provided, a default batch size (such as 20) may be used. Other hyperparameters 30 that may be used include the following: (a) validation epochs, which corresponds to the number of batches to present between each validation step (defaults to 10); (b) burn in epochs, which corresponds to the number of batches to present before any validation occurs (defaults to 100); (c) initial learning rate, which corresponds to the amount of the gradient of the error to add to the parameters of the neural network (defaults to 0.01); (d) minimum learning rate (defaults to 0.000001); (e) learning rate decay, which corresponds to the amount by which to reduce the learning rate each time validation fails (defaults to 0.9); and (f) validation threshold, which corresponds to how much the error must improve in order to consider training a success (defaults to 0.1). These defaults are chosen as illustrations for the invention and are not meant to be limiting. These hyperparameters 30 are key-values that are provided (or set to default) that provide parameters for the training worker 4 to act within. The training process 33 utilizes the hyperparameters 30 in connection with a recurrent neural network 45 called a Long Short Term Memory (LSTM) network, where LSTM units are the building blocks for the recurrent neural network 45. The LSTM neural network 45 of the present invention is created with the following topology: an input layer that is the size of each row in past plus 1, an LSTM layer that is 256 units wide, another LSTM layer that is 256 units wide, and a linear layer that is a single unit representing the predicted value. Neural network configuration and the use of neural networks in machine learning technology is known in the art. The particular network architecture of the present invention is depicted in FIG. 5.

The training step 33 includes two major parts: the burn in phase and the validation phase. The burn in phase utilizes an optimization method called ADAM, a mean squared error metric, and backpropagation through time to train the neural network on past data. This optimization method is known in the art. Each neural network of the neural network ensemble 45 is trained to predict the data point value at time t+1 given the mean values for time t+1 and the data point value for time t. The burn in phase repeats this process a number of times equal to the burn in epochs hyperparameter (either the input value for the default value). In the validation phase, the same process is repeated an additional number of times corresponding to the validation epochs hyperparameter (either input or default). After each iteration, error improvement is calculated as the normalized difference between the mean squared error at the previous iteration and the current iteration. If the error improvement on past data is at least the threshold hyperparamter the second step is repeated. Otherwise, the learning rate is multiplied by the learning rate decay hyperparameter. If the learning rate is greater than or equal to the minimum learning rate when it is decayed, the second step is repeated. Otherwise, the training step 33 ends.

Once the training step 33 is repeated until the learning rate cannot be decayed without going below the minimum learning rate, training 33 ends and post processing 34 begins. The post processing step 34 feeds the neural network ensemble 45 the past data one last time before making predictions 37. To generate a particular prediction 37, the post processing step 34 feeds the next future context data and the current output of the neural network 45 back into the neural network 45. This is repeated for all future context data points, which generates a sequence of predictions 37. This sequence of predictions 37 is multiplied by the inverse of the constant scale such that the predictions are in the domain of the original time series data. The final sequence of predictions 37 is transmitted 35 and stored in the predictions database 10. Because there is a known date 26 for each predicted value 37, the training worker 4 is able to combine prediction values 37 and dates 26 into value-date pairs. Each value-date pair is combined with the ID 20 of the current model to make an ID-value-date tuple 46. These prediction tuples 46 are stored in the predictions database 10 to be retrieved by the predictor application 6.

The predictor application 6 is used for fetching 40 the prediction tuples 46 from the prediction database 10 and aggregating 42 the predictions 46 for a given ensemble ID 20. It is a RESTful service with a single endpoint that requires three inputs: the ensemble ID 20 to be aggregated 42 and two dates (a start date 38 and an end date 39) that make up a time span. Given these inputs, the predictor 6 fetches 40 the list of predictions 46 with IDs 20 corresponding to the input ensemble ID 20 from the predictor database 10. All prediction tuples 46 associated with the ensemble ID 20 are fetched 40 and filtered 41 such that only predictions 46 falling within the specified date range are included. Following this filtration 41 the prediction tuples 46 are aggregated 42 into a sequence of predicted values. Each predicted value has two parts: a mean and a standard deviation. For each unique and sorted date in the prediction tuples 46, the final predicted value 48 is simply the mean and standard deviation of the predicted values 37 from all of the neural network models 45. The mean is intended to be used as the final prediction itself, while the standard deviation is used as a confidence metric. Final predictions with low standard deviation suggest high confidence, and final predictions with high standard deviation suggest low confidence.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification. When a range is stated herein, the range is intended to include all sub-ranges within the range, as well as all individual points within the range. When "about," "approximately," or like terms are used herein, they are intended to include amounts, measurements, or the like that do not depart significantly from the expressly stated amount, measurement, or the like, such that the stated purpose of the apparatus or process is not lost.

The present invention has been described with reference to certain preferred and alternative embodiments that are intended to be exemplary only and not limiting to the full scope of the present invention, as set forth in the appended claims.

I claim:

1. An integrated forecasting system with computerized components for forecasting a future performance value based on time series data corresponding to at least one past performance, the system comprising:

a. a training input routine executing at a microprocessor coupled to a non-transitory media storing instructions for executing the training input routine, the training input routine configured to:
  i. receive at least one data input message comprising an array of time series data comprising a plurality of data points, wherein each of the one or more data points comprises a single record of the time series data, further wherein each of the one or more data points comprises a date field, a value field, and a meta field;
  ii. for each of the date field, value field, and meta field, determine whether the particular field comprises a known value or an unknown value;
  iii. for each data point wherein it is determined that at least one of the date field, value field, and meta field for the particular data point comprises an unknown value, mark the particular data point as a context data point; and
  iv. for each data point wherein it is determined that each of the data field, value field, and meta field comprises a known value, mark the particular data point as a training data point;

b. a training scheduler executing at the microprocessor coupled to the non-transitory media storing instructions for executing the training scheduler, the training scheduler configured to:
  i. receive from the training input routine the times series data comprising the plurality of data points;
  ii. calculate a frequency associated with the time series data based on the known data field of each of the data points;
  iii. normalize the known value fields of each of the data points, wherein normalizing the known value fields comprises determining a constant scale that when multiplied by an absolute value of the known value fields of each of the data points results in a normalized value for each data point less than or equal to one;
  iv. extract metadata from the meta field of each data point and reproduce the metadata from the meta field of each data point into the meta field of each other data point such that the meta field of all data points comprise all of the metadata from each data point; and
  v. prepare a list of training jobs, the list comprising a number of training jobs, wherein the list of training jobs is assigned an ensemble ID, further wherein each of the training jobs is assigned a training job ID c. a job queue in communication with the training scheduler, the job queue configured to receive from the training scheduler the list of training jobs in a particular order and store the list of training jobs in the particular order received from the training scheduler for retrieval;

d. a training worker executing at the microprocessor coupled to the non-transitory media storing instructions for executing the training worker, the training worker configured to fetch each of the training jobs in the list of training jobs from the job queue in the particular order received from the training scheduler, and for each of the training jobs:
  i. assign each of the data points as one of past data and future data, wherein past data corresponds to training data value fields multiplied by the constant scale and meta values associated with the next data point, and wherein future data corresponds to context data meta fields shifted such that the ith entry is the meta value for the (i+1)th forecasted point;
  ii. train one or more neural networks using the past data; and
  iii. generate a sequence of predictions using the one or more trained neural networks, past data, and future data, wherein each of the predictions comprises a date, a value, and an ensemble ID, wherein the ensemble ID of the prediction corresponds to the ensemble ID assigned to the training jobs by the training worker;

e. a predictions database in communication with the training worker and configured to receive from the training worker the sequence of predictions and store the predictions for retrieval;
f. a predictor input routine executing at the microprocessor coupled to the non-transitory media storing instructions for executing the predictor input routine, the predictor input routine configured to receive a predictor input message and read from the predictor input message an input ensemble ID, a start date, and an end date;
g. a predictor executing at the microprocessor coupled to the non-transitory media storing instructions for executing the predictor, the predictor configured to:
   i. receive from the predictor input routine the input ensemble ID, start date, and end date;
   ii. fetch from the predictions database all of the stored predictions having an ensemble ID matching the input ensemble ID;
   iii. filter the fetched predictions such that only the predictions having a date within a time range defined by the input start date and input end date are obtained;
   iv. aggregate the filtered predictions;
   v. determine a mean predicted value and a standard deviation value for the aggregate predictions
wherein the mean predicted value is output as the forecasted future performance value and the standard deviation value is output as a confidence metric for the forecasted future performance value.

2. The system of claim 1, wherein the training input routine is further configured to receive an ensemble size input message and read from the ensemble size input message an ensemble size providing the number of training jobs to be prepared by the training scheduler.

3. The system of claim 1, wherein the training input routine is further configured to receive one or more options input messages and to read from each of the one or more options input messages one or more option inputs providing a number of hyperparameters to be used by the training worker to train the one or more neural networks.

4. The system of claim 1, wherein the date field of each data point includes a timestamp corresponding to a date when the single record associated with the particular data point occurred.

5. The system of claim 1, wherein the value field of a number of the data points includes a numeric value corresponding to an observed value of a particular characteristic associated with the particular data point.

6. The system of claim 1, wherein the meta field of each data point includes information denoting environmental factors associated with the record corresponding to the particular data point.

7. A computerized method for forecasting a future performance value based on time series data corresponding to at least one past performance, the method comprising the steps of:

a. receiving one or more training input messages at a microprocessor, wherein each of the training input messages comprises an array of time series data points, wherein each of the data points comprises a date field, a value field, and a meta field, further wherein each of the date field, value field, and meta field is one of a known value or an unknown value;
b. for each of the date field, value field, and meta field of each data point, determining whether the particular field comprises a known value or an unknown value;
c. for each data point wherein it is determined that at least one of the date field, value field, and meta field for the particular data point comprises an unknown value, mark the particular data point as a context data point; and
d. for each data point wherein it is determined that each of the data field, value field, and meta field comprises a known value, mark the particular data point as a training data point;
e. preparing a list of training jobs, the list comprising a number of individual training jobs, wherein the list of training jobs is assigned an ensemble ID, further wherein each of the individual training jobs is assigned a training job ID;
f. processing the list of training jobs starting with the first training job in the list and continuing through the list of training jobs, the processing of each training job comprising training one or more neural networks using the training data and context data associated with the particular training job to determine a predicted value associated with the particular training job;
g. storing the predicted value associated with each of the particular training jobs in a predictions database, wherein the predicted value of each of the training jobs is paired with a date associated with the particular training job and the ensemble ID and job ID associated with the particular training job;
h. receiving a prediction input message comprising a prediction ensemble ID, a
i. fetching from the predictions database all predicted values having an ensemble ID matching the input prediction ensemble ID;
j. aggregating all of the fetched predicted values;
k. calculating a mean predicted value from the aggregated predicted values; and
l. calculating a standard deviation from the aggregated predicted values;
wherein the calculated mean predicted value is output as the forecasted future performance value and wherein the calculated standard deviation is output as a confidence metric associated with the forecasted future performance value.

* * * * *